(12) United States Patent
Heimann et al.

(10) Patent No.: US 10,392,564 B2
(45) Date of Patent: Aug. 27, 2019

(54) PROCESS FOR PRODUCING BIO-PRODUCTS FROM BIOMASS USING ROTARY COMPRESSION UNIT

(71) Applicant: Enginuity Worldwide, LLC, Mexico, MO (US)

(72) Inventors: Robert L. Heimann, Centralia, MO (US); Nancy Heimann, Centralia, MO (US); Allison Talley, Mexico, MO (US)

(73) Assignee: Enginuity Woldwide, LLC, Mexico, MO (US)

( * ) Notice: Subject to any disclaimer, the term of this patent is extended or adjusted under 35 U.S.C. 154(b) by 0 days.

(21) Appl. No.: 15/210,559

(22) Filed: Jul. 14, 2016

(65) Prior Publication Data

US 2017/0015909 A1    Jan. 19, 2017

Related U.S. Application Data

(60) Provisional application No. 62/192,266, filed on Jul. 14, 2015.

(51) Int. Cl.
  *C10B 37/04*    (2006.01)
  *C10B 27/06*    (2006.01)
  (Continued)

(52) U.S. Cl.
  CPC .............. *C10B 37/04* (2013.01); *B01J 20/20* (2013.01); *C01B 32/184* (2017.08); *C01B 32/324* (2017.08); *C01B 32/39* (2017.08); *C05F 11/00* (2013.01); *C09K 17/02* (2013.01); *C10B 47/44* (2013.01); *C10B 53/02* (2013.01);
  (Continued)

(58) Field of Classification Search
  CPC combination set(s) only.
  See application file for complete search history.

(56) References Cited

U.S. PATENT DOCUMENTS 8,476,480 B1   7/2013   Brown et al.
8,667,706 B2   3/2014   Smith et al.
(Continued)

FOREIGN PATENT DOCUMENTS

CA        2731126       8/2012
WO      2009102131      8/2009
(Continued)

OTHER PUBLICATIONS

ISRWO of PCT/US2016/029620 dated Jul. 5, 2016.
(Continued)

*Primary Examiner* — Ellen M McAvoy
*Assistant Examiner* — Chantel L Graham
(74) *Attorney, Agent, or Firm* — Burris Law, PLLC

(57) ABSTRACT

A bio-product such as biochar, bio-coal, bio-oil, coke, and/or activated carbon material is formed by processing a starting biomass material comprising water-laden material. The starting biomass material is heated to below or above an autoignition temperature through a rotary compression unit (RCU) by generating steam through releasing unbound and bound waters in the biomass thus forming a bio-product. The biomass material being processed may be, without limitation, a woody or non-woody biomass material, such as cellulosic material and/or grain. The process can also form bio-oil from pyrolysis vapors which can be processed to other bio-products.

16 Claims, 11 Drawing Sheets

(51) Int. Cl.
| | |
|---|---|
| *C10B 31/08* | (2006.01) |
| *C09K 17/02* | (2006.01) |
| *B01J 20/20* | (2006.01) |
| *C10L 5/44* | (2006.01) |
| *C10L 5/26* | (2006.01) |
| *C05F 11/00* | (2006.01) |
| *C10B 53/02* | (2006.01) |
| *C10B 31/04* | (2006.01) |
| *C10B 47/44* | (2006.01) |
| *C10L 9/08* | (2006.01) |
| *C10C 5/00* | (2006.01) |
| *C01B 32/184* | (2017.01) |
| *C01B 32/324* | (2017.01) |
| *C01B 32/39* | (2017.01) |

(52) U.S. Cl.
CPC .................. *C10C 5/00* (2013.01); *C10L 5/44* (2013.01); *C10L 5/442* (2013.01); *C10L 9/08* (2013.01); *C10L 9/083* (2013.01); *C10L 9/086* (2013.01); *C10L 2200/0469* (2013.01); *C10L 2290/02* (2013.01); *C10L 2290/30* (2013.01); *C10L 2290/50* (2013.01); *Y02E 50/10* (2013.01); *Y02E 50/14* (2013.01); *Y02E 50/15* (2013.01); *Y02E 50/30* (2013.01); *Y02E 50/32* (2013.01); *Y02P 20/145* (2015.11)

(56) References Cited

U.S. PATENT DOCUMENTS

| | | |
|---|---|---|
| 9,140,945 B2 | 9/2015 | Kitajima et al. |
| 2012/0090221 A1* | 4/2012 | Banasiak ............... C10B 49/10 44/300 |
| 2012/0217442 A1 | 8/2012 | Jeney |
| 2015/0007446 A1* | 1/2015 | Robert .................... F26B 3/36 34/386 |
| 2015/0184098 A1 | 7/2015 | Talwar |
| 2017/0327428 A1* | 11/2017 | Shearer .................. C05B 17/00 |

FOREIGN PATENT DOCUMENTS

| | | |
|---|---|---|
| WO | 2011100695 | 8/2011 |
| WO | 2014027809 | 2/2014 |

OTHER PUBLICATIONS

Bridgwater, A.V.; Peacocke, G.V.C. 2000. Fast pyrolysis processes for biomass. Renewable and Sustainable Energy Reviews. vol. 4: pp. 1-73.

Demirbas, Ayhan. 2007. The influence of temperature on the yields of compounds existing in bio-oils obtained from biomass samples via pyrolysis. Fuel Processing Technology. vol. 88(6): pp. 591-597.

Yasuhara, Akio; Sugiura, Ginji. 1987. Volatile Compounds in Pyroligneous Liquids from Karamatsu and Chishima-sasa. Agricultural and Biological Chemistry. vol. 51(11): pp. 3049-3060.

Azargohar, R.; Dalai, A.K. 2006. Biochar as a precursor of activated carbon. Appl. Biochem. Biotechnol. vol. 129-132: 762-773.

Dalai, Ajay K.; Azargohar, R. 2007. Production of Activated Carbon from Biochar Using Chemical and Physical Activation: Mechanism and Modeling. Materials, Chemicals, and Energy from Forest Biomass. Chapter 29: pp. 463-476.

Azargohar, R.; Dalai, A.K. 2008. Steam and KOH activation of biochar: Experimental and modeling studies. Microporous and Mesoporous Materials. vol. 110 (2-3): pp. 413-421.

Sadaka, Samy; Boateng, A.A. Pyrolysis and Bio-Oil. Agriculture and Natural Resources. University of Arkansas Division of Agriculture FSA #1052. Accessed on May 2016 at < http://www.uaex.edu/publications/pdf/fsa-1052.pdf>.

Hagner, Marleena. 2013. Potential of the slow pyrolysis products birch tar oil, wood vinegar and biochar in sustainable plant protection—pesticide effects, soil improvement and environmental risks. Academic Dissertation in Environmental Ecology. Presented Sep. 20, 2013 at the University of Helsinki.

Czernik, S.; Bridgwater, A.V. 2004. Overview of Applications of Biomass Fast Pyrolysis Oil. Energy and Fuels. vol. 18: pp. 590-598.

Diebold, J.P. 1997. Overview of Fast Pyrolysis of Biomass for the Production of Liquid Fuels. Developments in Thermochemical Biomass Conversion. Chapter: pp. 5-26.

Xiu, Shuangning; Shahbazi, Abolghasem. 2012. Bio-oil Production and Upgrading Research: A Review. Renewable and Sustainable Energy Reviews. vol. 16: pp. 4406-4414.

Bridgwater, A.V.; Peacocke, G.V.C. Engineering Developments in Fast Pyrolysis for Bio-oils. Biomass Pyrolysis Oil Properties and Combustion Meeting in Golden, CO. Accessed on Jun. 21, 2016 at < http://digital.library.unt.edu/ark:/67531/metadc665006/m1/121/>.

Bridgwater, A.V. 1999. Principles and practice of biomass fast pyrolysis processes for liquids. Journal of Analytical and Applied Pyrolysis. vol. 51: pp. 3-22.

International Search Report for International Application PCT/US2016/042301, dated Sep. 23, 2016.

* cited by examiner

PROCESS FOR PRODUCING BIO-PRODUCTS FROM BIOMASS USING ROTARY COMPRESSION UNIT

CROSS-REFERENCE TO RELATED APPLICATIONS

This application claims the benefit of provisional application Ser. No. 62/192,266, filed on Jul. 14, 2016, the entire contents of which are incorporated herein by reference in their entirety.

FIELD

The present disclosure relates generally to a method of using a rotary biomass dryer to form products from bio-based sources. These products include but are not limited to bio-coal or bio-fuel, bio-char, coke, bio-oil, and/or activated carbon. More specifically, this disclosure relates to a process of drying and/or processing biomass materials such as cellulosic materials, as well as the products formed from said process.

BACKGROUND

The statements in this section merely provide background information related to the present disclosure and may not constitute prior art.

A conventional wood gasification apparatus uses only the friction created by a fixed screw and barrel. The screw design is typically one of a continuous decreasing volumetric design which increases the pressure on the cellulosic material and maximizes the frictional heating until the material reaches a temperature above its autoignition temperature. Once the vaporization temperature is reached, the cellulosic material is converted into a combination of combustible fuel gases that typically contains a mixture of methane, hydrogen and carbon monoxide. Any particulate material that is present is frictionally heated and propelled along the auger until it reaches a plasticizing or softening temperature and forms an in-situ seal between the auger and the housing. This in-situ seal prevents gas from flowing back along the auger to the housing inlet.

However, in practice, a conventional wood gasification apparatus is also prone to plugging as the plasticized is carburized. This plugging can be catastrophic, shutting down the process by overloading the electrical current and/or shearing coupling drives and/or bolts. Additionally, the plasticizing seal is minimal to non-existent when processing non-woody biomass due to lower lignin content. Once a plug forms, the unit must be allowed to off-gas, cool to below the autoignition temperature and then be disassembled for cleaning. The carbonized mass must be scraped from the threads and inside of the housing, a process that takes hours, which results in substantial lost production time.

A rotary compression unit (RCU), often referred to as a rotary biomass dryer, provides a low cost alternative to conventional biomass drying and processing. The RCU requires no external energy, only a motor to rotate the compression auger effectively heating the biomass by compression and friction to generate in-situ steam.

The RCU, which often has an adjustable nozzle, is also equipped with a compression screw. Similar to the wood gasification apparatus, the rotary biomass dryer is prone to plugging, which results in hours, if not days, to clean and restart the process. For RCU's powered by 100-500 horsepower, plugging may occur without notice and require a large hydraulic jack to extract the screw. In addition, the biomass dryer is deployed with an adjustable nozzle that is cumbersome and prone to high wear. During processing, only the biomass in direct contact with the compression screw or elongated tube is dried during the process.

SUMMARY

The present disclosure provides for a method of producing bio-products from starting biomass materials. The method includes the steps of providing a starting biomass material that includes a moisture-containing or water-laden material. A rotary compression unit (RCU) is provided having a compression screw, a barrel, and optionally one or more flow disrupters mounted on an interior surface of the barrel, the screw operable to rotate at a speed to produce friction and compression to generate a desired elevated temperature within the barrel and steam from bound and unbound water within the biomass. Passing the biomass through the RCU forms a bio-product. The method includes feeding the biomass material to the RCU and allowing the biomass material to be mixed and heated resulting from steam that is formed within the RCU from increased friction and pressure formed by rotating the compression screw. The method further includes removing the bio-product from the RCU, cooling the bio-product, and collecting the bio-product.

The starting biomass material can be either woody or non-woody biomass. In one form, the biomass is heated to a temperature below autoignition. Steam explosion and hydro-flaking can occur by causing cell explosion within the RCU and the bio-product formed is dried flakes of the starting biomass free from bound water. The bio-product from the hydro-flaking is operable to form starting materials for any one of animal bedding, animal feed, and ethanol.

In another aspect of the present disclosure, the biomass material is heated to a temperature at or above autoignition causing pyrolysis of the biomass material and the pyrolysis reaction generates steam, pyrolysis vapors, and biochar. The method can further include the step of condensing the bio-product by passing the bio-product through a reflux condenser followed by additional cooling in an aftercooler. The bio-product can be biochar, bio-coal, bio-fuel, coke, bio-oil and the other products.

The method can further include the steps of condensing the pyrolysis vapors in a second condenser to generate pyrolysis liquid. The pyrolysis liquid includes bio-oil, pyroligneous acid (PLA), and tar and the bio-product from the reflux condenser is biochar. The second condenser can be selected from the group consisting of a shell and tube condenser and a spray condenser. The second condenser can be a spray condenser system including a vapor receiving apparatus and a spray condenser. The vapor receiving apparatus includes flow channels and a fines trap, and is adapted to initially cool the pyrolysis vapors. The vapors move downward and then turn back upward toward a vapors receiving apparatus outlet to pass into the spray condenser, the cooling and turning of the vapors causes fines and particles of tar to drop into the fines trap. The vapors from the vapor receiving apparatus are fed into the spray condenser to be sprayed with water causing the vapors and the water to cool and condense into pyrolysis liquid forming a mixture of water, bio-oil and PLA.

The method further includes the steps of spraying water on the pyrolysis vapors to about 30-40% water mixed with the pyrolysis liquid and separating the bio-oil from the PLA.

In yet another form of the present disclosure, the method includes the steps of combining the bio-oil with the biochar forming a bio-coal. In yet another form, the biochar is pretreated to remove inorganic compounds in order to form coke.

The method can further include the steps of subjecting the biochar to second energy source and an activation agent in order to form activated carbon. The biochar can be used as a starting material for any one of a soil amendment, a filtration device, activated carbon, and graphene.

The present disclosure further provides for a system operable to produce bio-products from starting biomass materials. The system includes a feeding mechanism adapted to feed a starting biomass material; a rotary compression unit (RCU) having a compression screw, a barrel, and optionally one or more flow disrupters mounted on an interior surface of the barrel. The screw is operable to rotate at a speed to produce friction and compression within the barrel to generate a desired elevated temperature to operate below, at, or above an autoignition temperature of the biomass material. Steam is produced from bound and unbound water within the biomass causing heating of the biomass. The compressed and heated biomass forms a bio-product. The system includes a first condenser for receiving the bio-product from the RCU. It can further include an optional second condenser for receiving steam and vapors exiting the RCU. An aftercooling device is provided for receiving the condensed bio-product from the first condenser and optionally from the second condenser. The second condenser is operable to produce pyrolysis vapor when the RCU operates above autoignition temperature causing pyrolysis of the starting biomass material. The bio-product is selected from the group consisting of biochar, bio-coal, bio-oil, coke, and combinations thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

Figure 1:
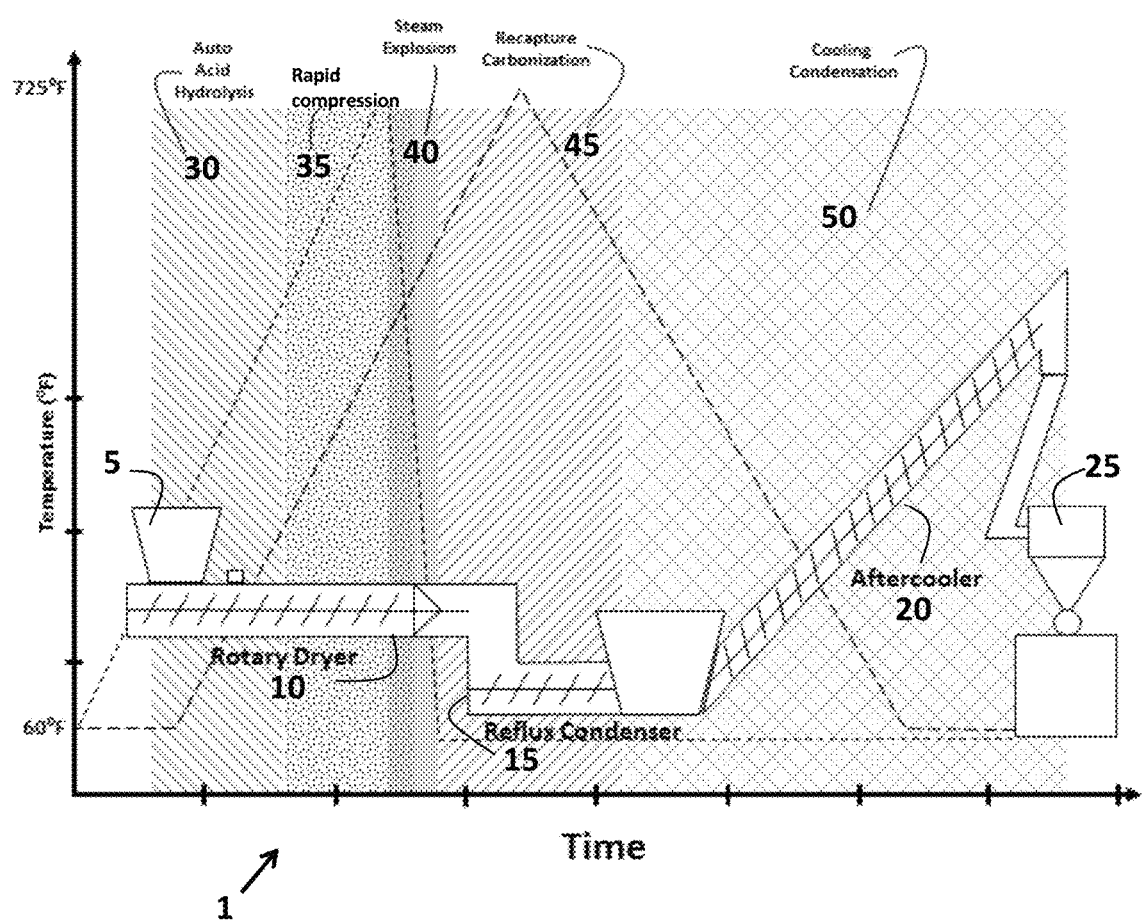
FIG. 1 is a schematic representation of a rotary compression unit (RCU) assembly.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure addresses the treatment of biomass starting materials such as moisture-containing or water laden materials by providing an apparatus and method that adapts a rotary compression unit (RCU) for drying, gasification, or bio-product formation. The process is operable for the formation of several products including but not limited to biofuel, bio-coal, biochar, bio-oil, coke, activated carbon and other condensation products or bi-products resulting from thermal treatment of a biomass. The incorporation and use of such an apparatus in other types of systems to dry or form other materials is contemplated to be within the scope of the present disclosure. The material being thermally treated may be any woody or non-woody biomass such as agricultural waste such as, without limitation, a cellulosic material, grain, or another biomass material. For example, the material may be, without limitation, oak sawdust, corn, cornstover, juniper, industrial waste products, animal or human waste, and/or a mixture thereof.

Biomass materials are generally a mixture of three basic cellulosic materials, namely, cellulose, hemicellulose and lignin along with interstitial bound and unbound water. A RCU for biomass can function as a steam dryer or biomass processor as it uses the heat of compression in the Second Law of Thermodynamics to produce steam thereby effectively drying the wet biomass material or causing pyrolysis or both. Typically, no external heat source is required. The RCU includes a compression screw that mixes and compresses the biomass feed within a fixed volume. The compression behavior and friction increases pressure and thus temperature and forms steam, which increases pressure even further. The steam comes from unbound and at least some bound water found in the starting biomass material.

Treatment of biomass materials can fall into three broad categories or ranges, namely: (1) mere drying or dehydration/rectification which can be referred to as non-destructive drying; (2) an intermediate treatment step which includes at least partial destruction, which can be referred to as torrification and carbonization; and (3) destructive drying which encompasses the complete carbonization of cellulosic material. Mere drying, which can mean operating temperature of about 110° C. or above and results in the removal of unbound water which can create steam. Mere dehydration occurs typically between 200° C. and 235° C. Rectification can occur between 235° C. and 250° C. which includes the removal of bound water as well. The rotary screw typically can operate at a suitable RPM to achieve this desired temperature. In an example, the RPM for an example six-inch or twelve-inch diameter compression screw to achieve these temperatures can be between 600-800 RPM.

For an intermediate treatment range, the RCU typically functions in the semi-destructive range, between a temperature of about 250° C. and 400° C. Within this temperature range, both unbound waters and bound waters are released from the biomass materials as well as additional pyrolysis vapors. This also forms biochar characterized by having some carbonization and porosity. Typically, a torrification range is between 250° C. and 270° C. and above that is considered carbonization (270° C.-400° C.). In an example the rotary screw typically can operate at a suitable RPM to achieve this desired temperature. In an example, the RPM for an example six-inch or twelve-inch diameter compression screw to achieve these temperatures can be between 800-1200 RPM. The pyrolysis vapors can be removed and processed to form other bio-products to be discussed further below. However, if the pyrolysis vapors are not removed from the RCU, they can be condensed in the biochar pores thereby forming bio-coal.

Treatment above 400° C. is considered destructive because it creates bio-products that can be fully carbonized, thus removing all water from the material as well as reactive products from the destruction and carbonization of the starting cellulosic material. Drying above 400° C. is considered destructive drying because it creates biofuel, biochar, bio-coal, bio-oil and coke. This can also be referred to as gasification. In an example the rotary screw typically can operate at a suitable RPM to achieve this desired gasification temperature. In an example, the RPM for an example six-inch or twelve-inch diameter compression screw to achieve these temperatures can be above 1200 RPM.

Referring to FIG. 1 a biomass rotary compression system (1) is shown and generally includes a feeding mechanism (5), a rotary compression unit (RCU) (10), a reflux condenser (15), an aftercooler stage (20), and an exit mechanism (25). The system can further include an additional condenser shown in FIGS. 2C, 2D, 3A, 3B, and 4, that runs parallel with the reflux condenser depending on the intended purpose of system (1) and desired bio-products. Along the entire length of the system (1), the various portions of the system (1) may also be described to include various zones, namely, auto acid hydrolysis (30), rapid compression (35), steam explosion (40), recapture carbonization (45), and cooling condensation (50). Some of these zones may overlap with one another as shown in FIG. 1 with respect to the rapid compression zone (35) and the steam explosion zone (40). The biomass material may be subjected to any of these zones either individually or in any combination depending on the desired output. Further details associated with a rotary mass dryer system and a wood gasification system are described in U.S. Pat. Nos. 8,667,706 and 7,144,558, respectively, the entire contents of which are hereby incorporated by reference.

An RCU (10) may perform better with a uniform feed rate in order to achieve a relatively high efficiency. In other words, it is desirable that the apparatus maintains a uniform flow rate provided by feeding mechanism (5). Thus system (1) may include one or more feed improvements, namely, a crammer feeder, an in-feed mixer, a preheater, and/or a dual belt feeder to enhance the uniformity of the flow rate. System may also incorporate the use of a pretreatment, such as without limitation in-situ acid treatment, e.g., auto acid hydrolysis, hydroxide treatment, or inorganic sequestering. Further details associated with feed improvements and pre-treatment can be found in co-pending U.S. patent application Ser. No. 15/066,894, filed Mar. 10, 2016, which claims priority to U.S. Provisional Patent Application No. 62/130,820 filed Mar. 10, 2015, the entire content of which is hereby incorporated by reference. In an example, a crammer feeder is used as described in the Ser. No. 15/066,894 application, which provides a uniform feed rate to reduce dust created by windage, which may result from the compression unit.

Figure 2A:
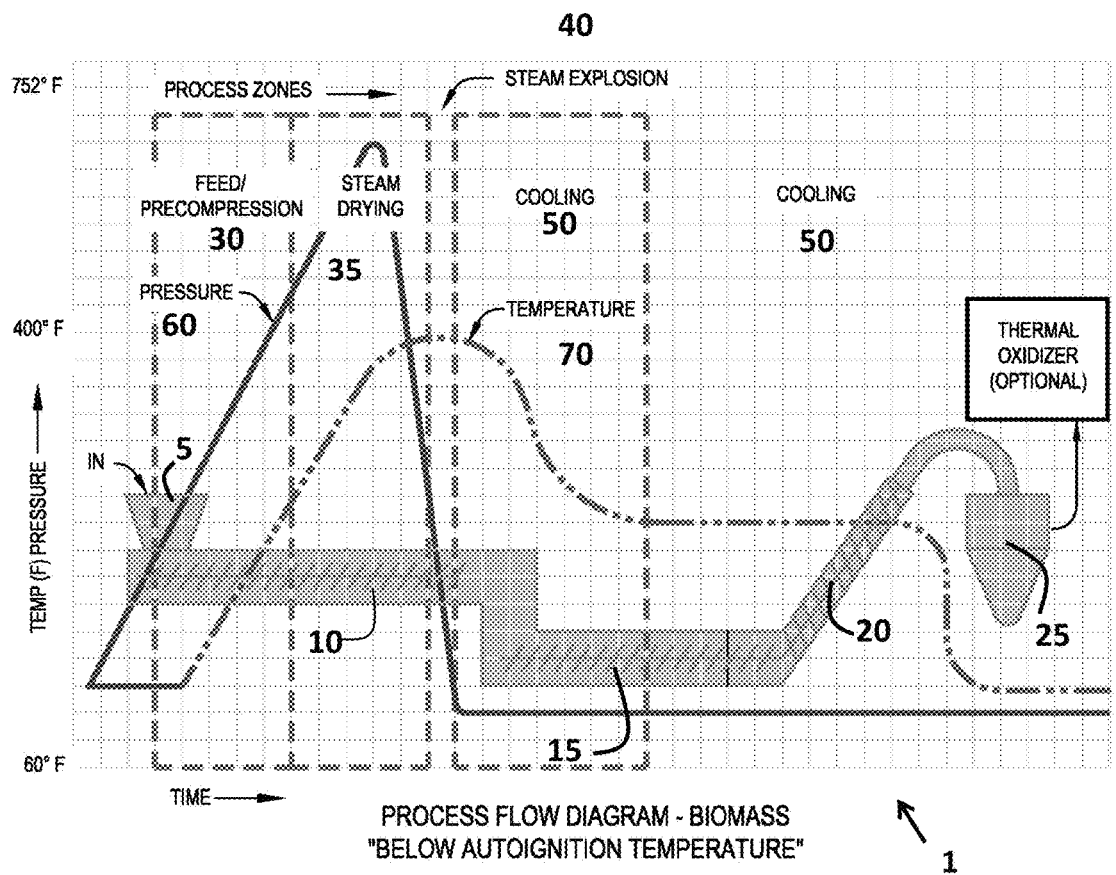
FIG. 2A is a schematic representation of the RCU of FIG. 1 operated below the autoignition temperature.
Figure 2B:
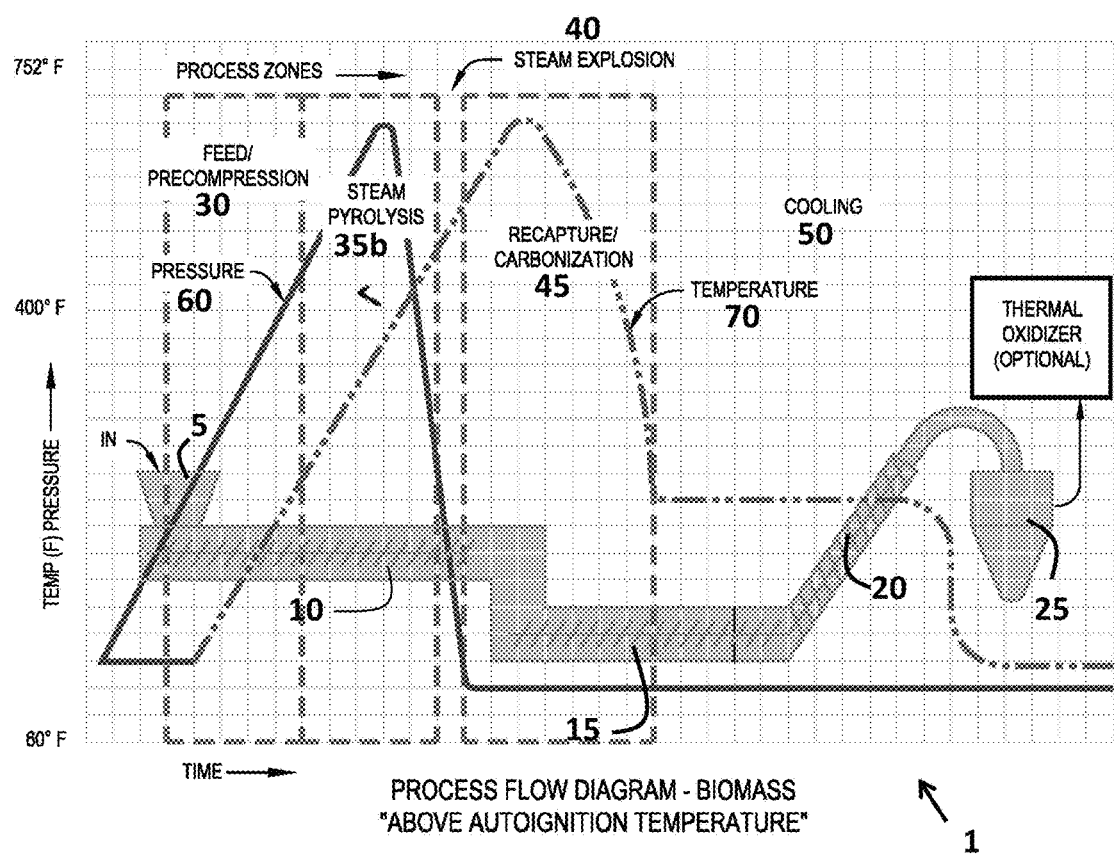
FIG. 2B is a schematic representation of the RCU of FIG. 1 operated above the autoignition temperature.

Referring now to FIGS. 2A and 2B, pressure (60) and temperature (70) that occurs in a biomass RCU system (1) increases during its operation as the biomass material moves from the feeding mechanism (5) through the RCU (10). The temperature (70) and pressure (60) increases through the pretreatment or precompression (e.g., auto acid hydrolysis) stage (30) and the rapid compression or steam drying or pyrolysis stage (35). FIG. 2A shows a process flow diagram for treating the biomass below autoignition temperature. Accordingly, process step (35) dries the biomass, i.e., removes bound and unbound water. The process flow diagram of FIG. 2B shows treating the biomass above the autoignition temperature. Accordingly, this causes steam pyrolysis (35b) of the biomass resulting in production of additional pyrolysis vapors. Thermal control of the process can be achieved through control of the rotational speed of the compression screw and the feed rate of the biomass starting material.

Figure 2C:
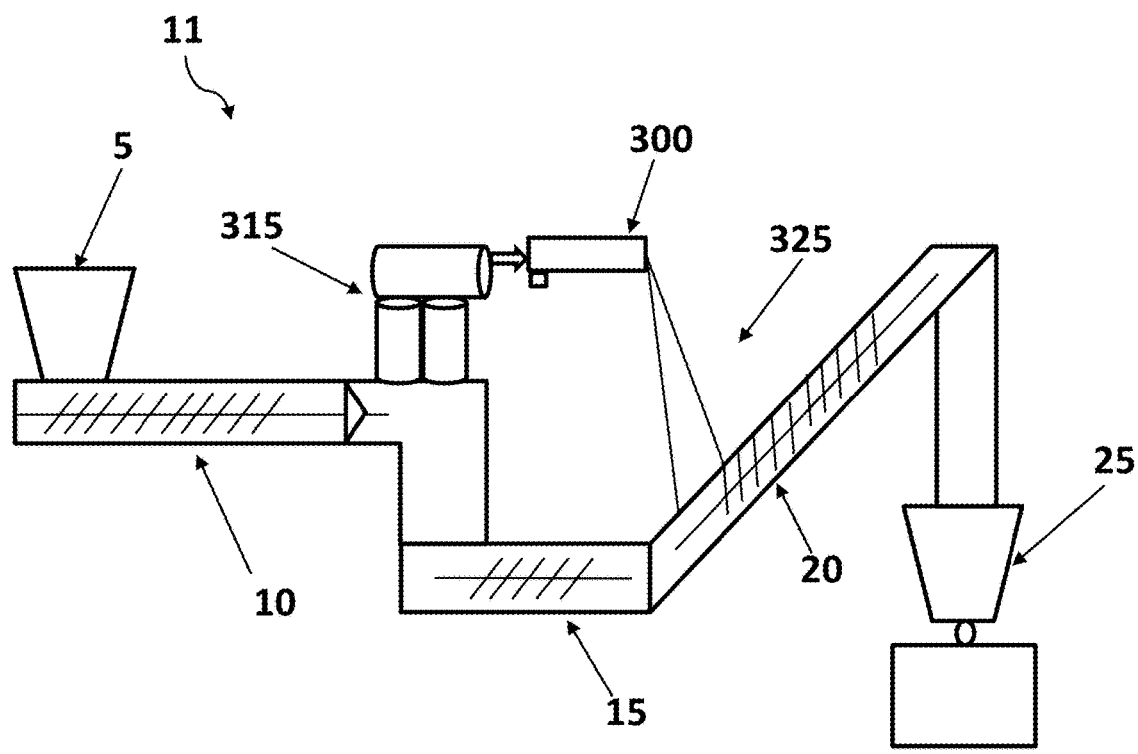
FIG. 2C is a schematic representation of a RCU system further including a second condenser being a shell and tube condenser coupled to the RCU and an aftercooler.

The pressure in both processes reaches a peak during the rapid compression (30) or steam drying/pyrolysis stage (35, 35b) and then rapidly decreases as the biomass moves through the steam explosion stage (40) or from the biomass dryer (10) into reflux condenser (15). In FIG. 2C (discussed below), pyrolysis vapors and other gasses can be captured and condensed into bio-oil using a second condenser. A manifold apparatus can be useful in capturing the gas and feeding it into the second condenser.

In the example of FIG. 2C, a shell and tube condenser is used which is described with reference to FIGS. 3A and 3B. However, in another form, a spray condenser is used as described below with reference to FIG. 4. When the temperature (70) does not reach the autoignition temperature limit, a recapture/carbonization stage does not occur, but rather the biomass material moves from steam drying (35) directly into the cooling stage (50) as shown in FIG. 2A. However, when the temperature (70) does reach the autoignition temperature limit, a recapture/carbonization stage (45) occurs following the steam pyrolysis (35b) stage and the initiation of the cooling stage (50) is delayed as shown in FIG. 2B.

If the temperature is raised to at or above autoignition temperature, pyrolysis occurs forming steam, biochar, and pyrolysis vapors. If the pyrolysis vapors are not captured as gases from the RCU, they will recombine into the biochar forming bio-coal.

Referring to FIG. 2C, an example rapid compression system (11) is shown with a dual parallel condenser construction. This form is especially useful in forming bio-char, bio-oil, and bio-coal, depending on the desired result, particularly for the intermediate treatment scenario described hereinabove. In this example, a biomass RCU system (11) is shown and generally includes a feeding mechanism (5), a RCU (10), a reflux condenser (15), a second condenser (300), an optional manifold apparatus (315), an aftercooler stage (20), and an exit mechanism (25). The second condenser (300) can run parallel with the reflux condenser (15) depending on the intended purpose of system (11).

When operating at or above autoignition temperature of the biomass material, pyrolysis vapors are produced through the RCU unit (10) which can be captured in a gas manifold apparatus (315). If pyrolysis vapors are treated with high temperature steam, synthetic gas (Syngas) can be formed. Syngas can be a desired product for several uses in industry due to its high hydrogen content. Partial condensation can occur of the gasses in manifold apparatus (315) which is then fed into the second condenser (300). The manifold is optional, but contributes to better condensation of the pyrolysis vapors.

Condenser (300) can be a shell and tube condenser as described in more detail below related to FIGS. 3A and 3B. In another example, condenser (300) can be a spray condenser as shown in FIG. 4. Condenser (300) can produce a liquid condensate (325) which can be referred to as pyrolysis liquid. The pyrolysis liquid is a mixture of bio-oil, pyroligneous acid (PLA), tar, and water. Other terminology for these components include bio-crude oil, tar oil, wood vinegar, wood pitch, and wood tar. The condensate from the second condenser can further be treated with water. At about 30-40% water content, tar, PLA, and bio-oil naturally separate with the oil being the lightest and settling on a top layer, tar on a bottom layer, and PLA mixed with the water in a center layer.

Figure 2D:
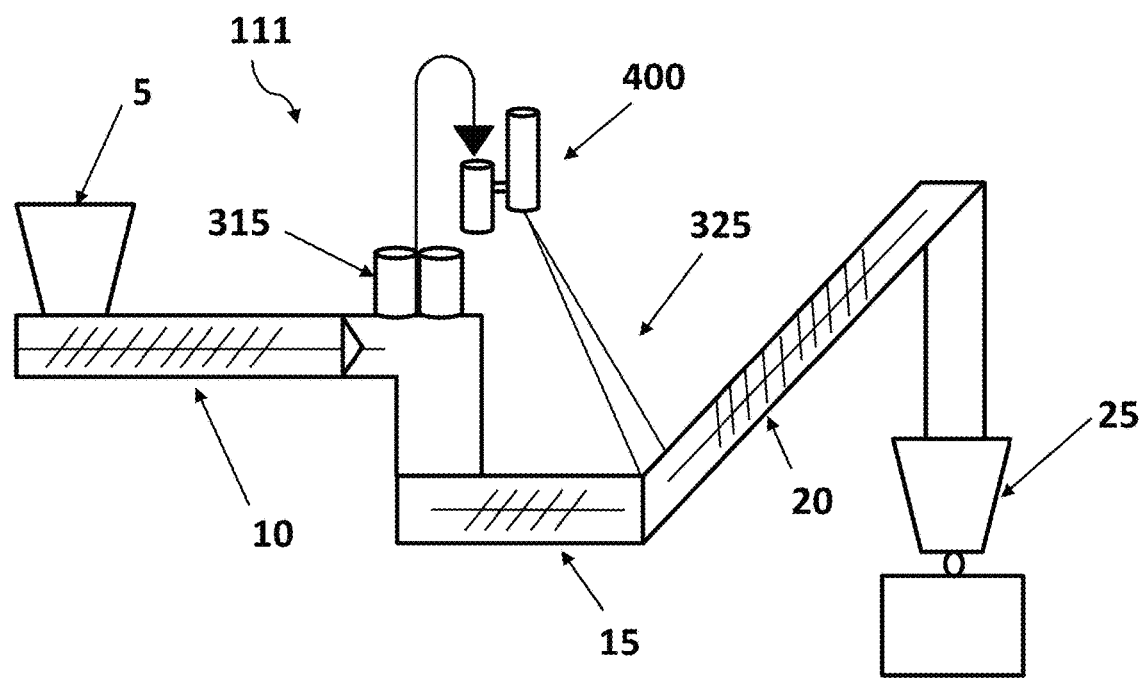
FIG. 2D is a schematic representation of a RCU system further including a second condenser being a spray condenser coupled to the RCU and an aftercooler.

Referring to FIG. 2D, an example rapid compression system (111) is shown with a second condenser (400) construction. This form is especially useful in forming bio-char, bio-oil, bio-coal, and coke depending on the desired result. In this example, a biomass RCU system (11) is shown and generally includes a feeding mechanism (5), a rotary biomass RCU (10), a reflux condenser (15), a second condenser (400), an optional manifold apparatus (315), an aftercooler stage (20), and an exit mechanism (25). The second condenser (400) can run parallel with the reflux condenser (15) depending on the intended purpose of system (111).

Pyrolysis vapors produced during pyrolysis in the RCU (10) can be captured in an optional gas manifold apparatus (315). Partial condensation can occur of the gasses in manifold apparatus (315) which is then fed into the second condenser (400). Condenser (400) can be a spray condenser or a spray condenser system as described in more detail below related to FIG. 4 below. Condenser (400) can produce a liquid condensate (405) which can be referred to as pyrolysis liquid. The resulting condensate (405) can be used in a variety of ways. Pyrolysis liquid is generally made up bio-oil, PLA, and tar. Bio-oil can be separated on its own from remaining condensate and be used for a variety of purposes. The bio-oil product can be recombined with the resultant bio-product (i.e., biochar) produced in the reflux condenser (15) and thus forming a bio-coal and a storage mechanism for the bio-oil. To combine the bio-oil with the biochar, the bio-oil can be sprayed over the material from the reflux condenser (15). The bio-oil can also be fed to the bio-product leaving reflux condenser (15) or it can be recombined at any point throughout aftercooler (20).

Biochar is defined as a bio-product material that has some carbonization along with a given porosity. The bio-oil that can be formed through condensate in both the reflux condenser and the second condenser can be condensed back into the biochar and thus forms a form of bio-coal. A bio-coal has a significantly reduced porosity but has a much higher BTU content and thus can provide a desirable form of biofuel.

Bio-oil is inherently unstable and rapidly oxidizes to a solid thereby rendering it a poor product for conversion to fuels. Accordingly, this, among other characteristics, make it difficult to transport and creates other challenges to using it as a viable fuel source. The stability of the bio-oil can be improved due to the added pressure and/or in conjunction with additions of KOH in process. When forming bio-coal, where the bio-oil is condensed within the pores of the co-produced biochar, by adding heat and pressure, bio-oil can flow freely from the biochar. Bio-coal product can therefore be deployed as a means to transport bio-oil within the pores of the biochar. The present disclosure provides for a system and process of producing bio-oil followed by reintroducing the bio-oil with biochar previously formed. Due to its high porosity, biochar creates storage space for the bio-oil which can then provide for a viable transportation medium. In a combined state with biochar, bio-oil is stable.

Figure 3A:
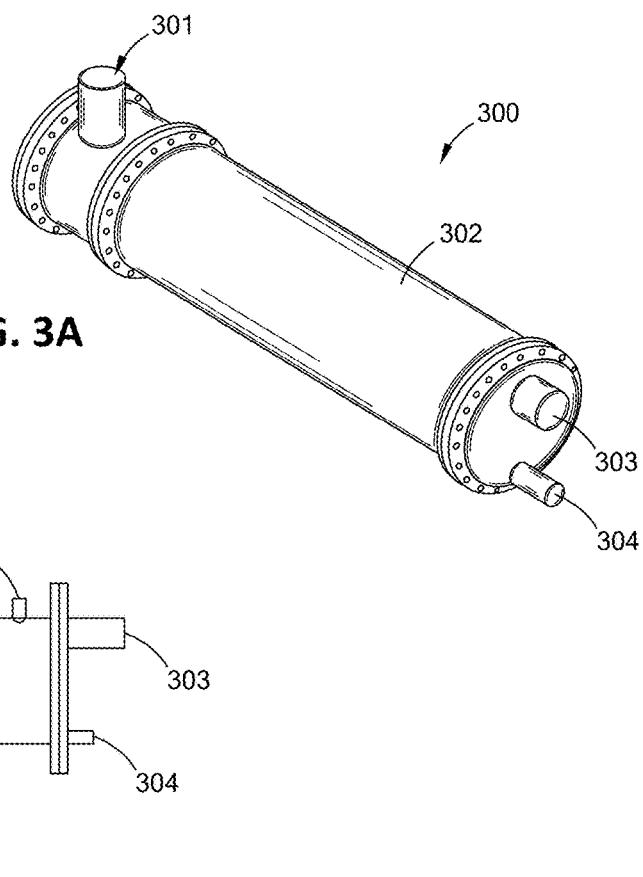
FIGS. 3A and 3B illustrate a shell and tube condenser according to the present disclosure.
Figure 3B:
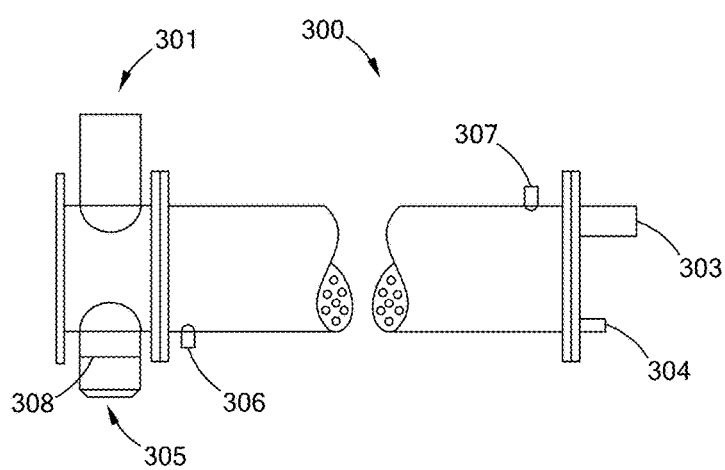
Figure 4:
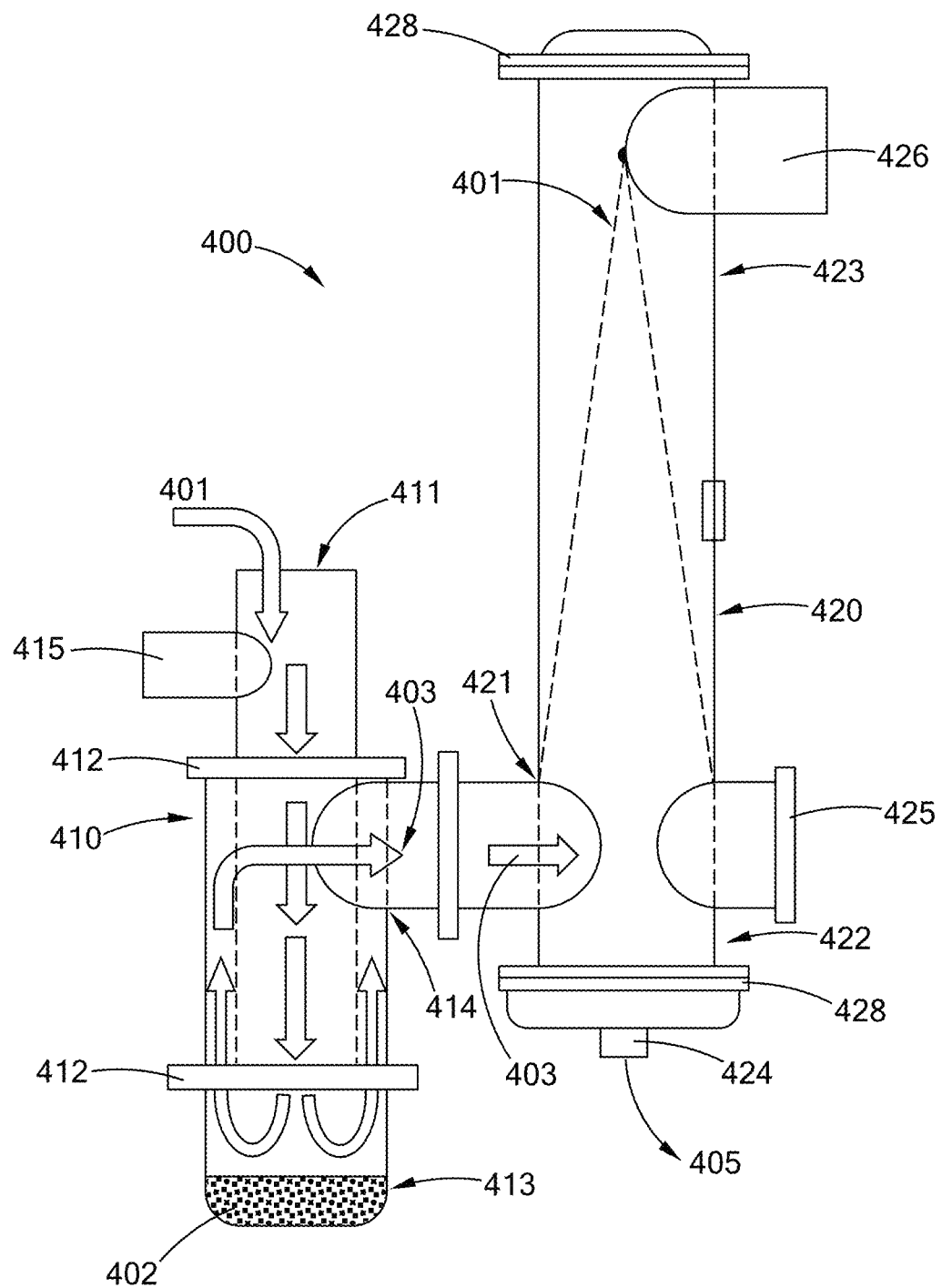
FIG. 4 illustrates a spray condenser according to the present disclosure.

Referring to FIGS. 3A and 3B, an example second condenser (300) from FIG. 2C is provided. Condenser (300) can be a shell and tube condenser. Condenser (300) can include an outer shell (302) formed around tubes that extend from inlet (301) that vents through vent (303). Some vapors that may be formed in the pyrolysis reaction that can be released through the condenser can include but not limited to carbon monoxide, carbon dioxide, and hydrogen. Coolant can be provided through coolant inlet (306) and exiting through coolant outlet (307). The particle trap (305) can include a cap (308). A drain (304) is provided to collect liquid condensate. The liquid condensate (325) can be pyrolysis liquid and collected separately or combined with the bio-product from the reflux condenser (15).

In another form of the present disclosure, the second condenser can be a spray condenser. Referring now to FIG. 4, in yet another form of the present disclosure, the second condenser 400, from FIG. 2D, is a spray condenser system 400. The spray condenser system 400 includes a vapor receiving apparatus 410 and a spray condenser 420. Vapor receiving apparatus 410 includes an inlet 411 which allows for vapors 401 to pass through flow channels 412. Flow channels 412 allow the vapor to flow downward before turning nearly 180 degrees back upward to outlet 414. The vapors 401 continue to cool as they pass through flow channels 412 and release additional particles 402 collected in a fines trap 413. The cooling effect along with gravimetric forces cause the particles to drop out of the vapor 401 stream. Particles 402 include fines, which are microscopic pieces of char or carbon, and particles of tar. This also helps further remove tar and fines to reduce the likelihood of plugging.

Apparatus 410 can further include an optional second inlet 415 for receiving multiple inlet streams. Alternatively, inlet 411 and second inlet 415 can be sized differently to accommodate differently sized delivery streams. In an example, inlet 411 defines an 8-inch diameter and second inlet 415 defines a 6-inch diameter. Typically, it can take up to 90 days or more to clean char and tar from a pyrolysis vapor product after condensation. Spray condenser system 400 allows for continuous and almost immediate cleaning of the vapor stream as a result of the construction of vapor receiving apparatus 410. Vapor receiving apparatus 410 can further include plates 412 that provide for construction joints for the assembly of the unit and to facilitate cleaning of internal components of apparatus 410. These are positioned spaced apart vertically relative to each other. Spray condenser 420 can further include ring flanges 428 to also provide construction joints and to facilitate cleaning of the condenser 420.

The vapors 401 after being somewhat cooled and releasing heavier solid particles form vapor stream 403 which is then fed through outlet 414 and into spray condenser 420. The vapors from apparatus 410 are fed through spray condenser inlet 421, typically positioned at a lower end 422 of spray condenser 420. As the cooled vapors 403 enter condenser 420, water 404 is sprayed from an upper section 423 of spray condenser 420. The water cooling causes the vapors 403 to condense into pyrolysis liquid 405. Liquid 405 mixed with water can be collected through liquid discharge 424. It has been determined that the fines trap 413 not only separates fines but also separates tars. Tar vapors can deposit first on micro particles of char similar to snowflakes forming on a dust particle. Spray condenser 420 can further include an outlet to atmosphere 426 and a clean out 425. Both allow for access to an interior chamber of the spray condenser 420. Using a spray condenser 420 allows for the mixing of water with the pyrolysis liquids within the condenser and thus eliminating the need for an additional step to create the 30-40% water content to allow the components of the pyrolysis liquids to separate into bio-oil, PLA, and tar.

Figure 5:
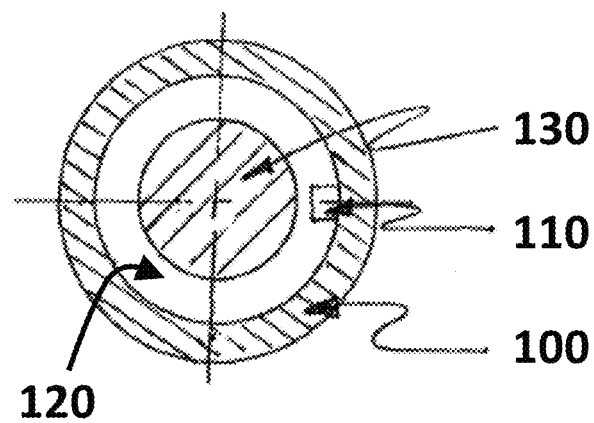
FIG. 5 is a cross-sectional view of a screw and barrel assembly for the rotary biomass dryer of the present disclosure.

Referring now to FIG. 5, in order to reduce the occurrence of plugging in the barrel (100) of the RCU, one or more flow disrupters (110) can be installed in the form of a shaped metal component located on the inside of the barrel or elongated housing (100). The flow disrupters (110) project into the passageway (120) created in the screw (130) and barrel (100) through which the biomass material flows. The flow disrupters (110) are designed so that they do not make contact with the screw (130). The flow disrupters (110) serve two purposes: 1) to assist in converting the rotary motion of the biomass as it is compressed to linear motion; and 2) provide a means for mixing the biomass such that the biomass flows over onto its self, thereby, allowing for the occurrence of more uniform drying. A single flow disrupter (110) may be utilized or when desirable a plurality of flow disrupters (110) spaced either radially about the inner diameter of the barrel (100) and/or continuously spaced throughout the barrel (100). The use of the flow disrupters (110) is found to improve overall throughput and enhance quality of the biomass material through the rotary biomass dryer system. Further details associated with improvements to decrease plugging and increasing efficiency of the drying apparatus and process can be found in co-pending U.S. patent application Ser. No. 15/140,409, filed Apr. 27, 2016, which claims priority to U.S. Provisional Patent Application No. 62/153,130, filed Apr. 27, 2015, the entire content of which is hereby incorporated by reference.

According to one aspect of the present disclosure, during drying operations working under the autoignition temperature of biomass, the process will first flash to steam unbound waters followed by bound waters and then the predetermined (e.g., engineered) or desired portion of the volatile fraction of the biomass. Under these drying conditions the biomass can be dried to desired moisture content and reduction of volatile fraction. The product may develop a light tan through a dark brown color depending on the type of biomass material, moisture content, and particle size. Products dried to moisture content ranging from 10 wt. % to 15 wt. % can readily be stored or processed into pellets, logs, pucks, briquettes or another convenient shape form.

Figure 6A:
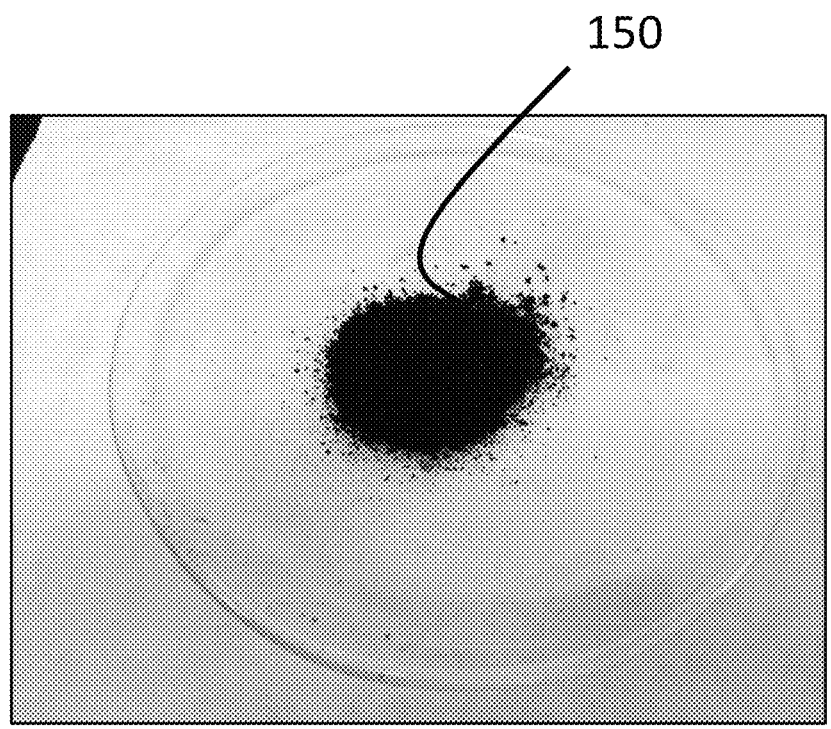
FIG. 6A is a pictorial representation of a biochar powder formed according to the teachings of the present disclosure.
Figure 6B:
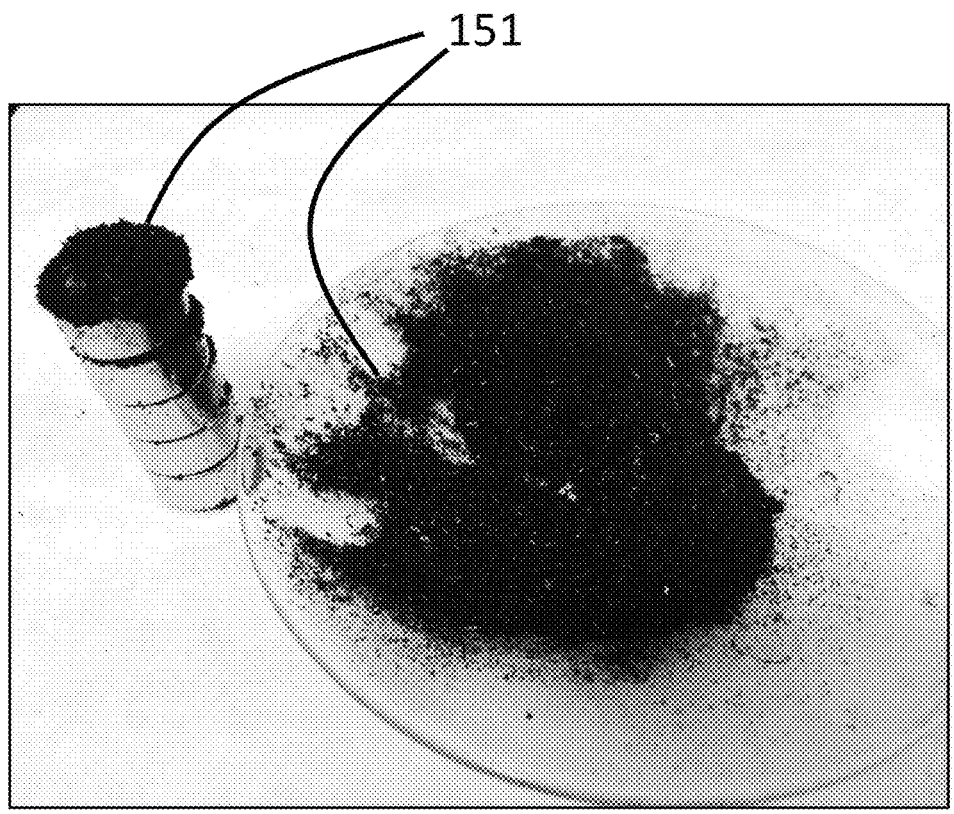
FIG. 6B is a pictorial representation of paramagnetic biochar particles formed according to the teachings of the present disclosure.
Figure 6C:
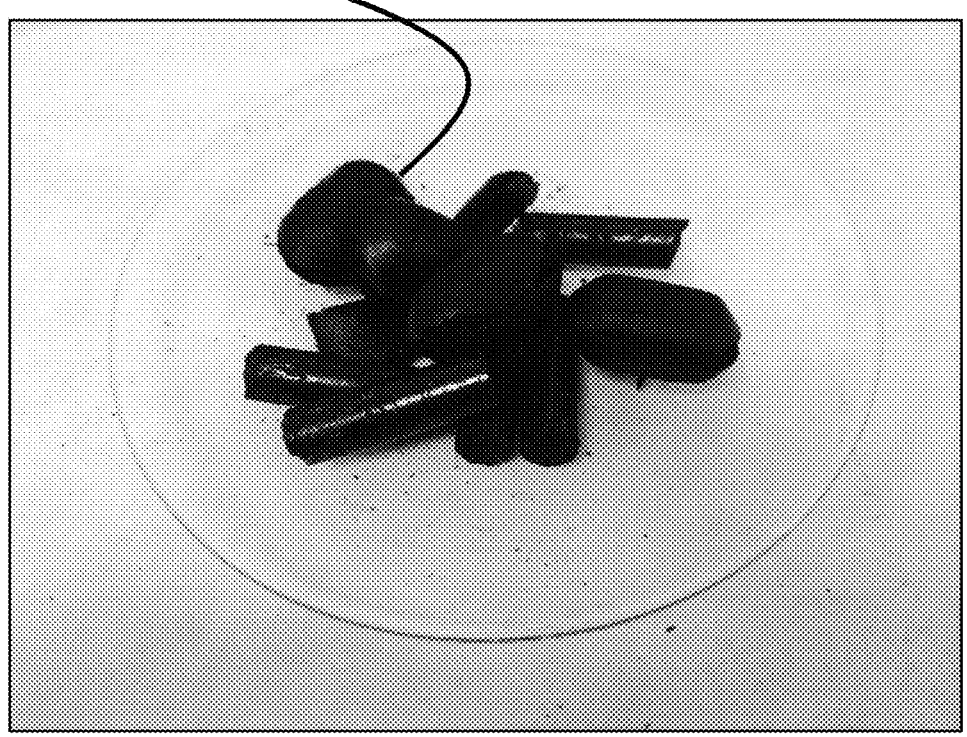
FIG. 6C is a pictorial representation of another biochar material formed according to the teachings of the present disclosure in a pelletized shape.

More work/pressure can be exerted on the biomass by using an adjustable barrel in the dryer and/or deployment of a tapered and/or adjustable nozzle/choke flange. Processing under these conditions results in processing temperatures above the autoignition temperature of biomass. When the rotary biomass dryer is used in conjunction with a reflux condenser/aftercooler, carbonaceous materials including, but not limited to, biofuel, bio-coal, biochar, and coke can be formed. Several examples of biochar in the form of a powder 150, paramagnetic particles 151, and pellets 152 or briquettes are shown in FIGS. 6A-6C. Typically, bio-coal and biofuel can be produced just by operating the process above the autoignition temperature of the biomass. Biochar is produced when one or more gases are moved away from the reflux condenser during the processing of the biomass. Coke represents a higher temperature version of bio-coal pretreated to remove undesirable inorganic compounds, such as chlorine. Some of these materials can be formed into activated carbon with additional processing using any convenient energy source such as ovens, microwaves and an activation agent such as KOH, carbon dioxide or the like.

EXAMPLE 1

Processing of Corn Stover to Biochar

Corn stover having the chemical properties shown in Table 1 was processed above its autoignition temperature using a rotary biomass dryer (with reflux condenser and aftercooler stage) according to the teachings of the present disclosure. More specifically, the raw corn stover includes about 10.79 wt. % ash, and 69.00 wt. % volatile matter. Overall the corn stover comprises about 43.93 wt. % carbon, 38.65 wt. % oxygen, 1.18 wt. % nitrogen, and 5.32 wt. % hydrogen. During storage, the corn stove may absorb about 10.14 wt. % of moisture (i.e., water).

TABLE 1

| Corn Stover (Raw) Composition & Properties | | | | |
|---|---|---|---|---|
|  | METHOD | UNITS | MOISTURE FREE | AS RECEIVED |
| Moisture Total | ASTM E871 | wt. % |  | 10.14 |
| Ash | ASTM D1102 | wt. % | 10.79 | 9.70 |
| Volatile Matter | ASTM D3175 | wt. % | 69.00 | 62.00 |
| Fixed Carbon by Difference | ASTM D3172 | wt. % | 20.21 | 18.16 |
| Sulfur | ASTM D4239 | wt. % | 0.126 | 0.112 |
| $SO_2$ | Calculated | lb/mmbtu |  | 0.310 |
| Net Cal. Value at Const. Pressure | ISO 1928 | GJ/tonne | 16.63 | 13.18 |
| Net Cal. Value at Const. Pressure | ISO 1928 | J/g | 16634 | 13184 |
| Gross Cal. Value at Const. Vol. | ASTM E711 | J/g | 17792 | 15989 |
| Gross Cal. Value at Const. Vol. | ASTM E711 | Btu/lb | 7650 | 6874 |
| Carbon | ASTM D5373 | wt. % | 43.93 | 39.48 |
| Hydrogen* | ASTM D5373 | wt. % | 5.32 | 4.78 |
| Nitrogen | ASTM D5373 | wt. % | 1.18 | 1.06 |
| Oxygen* | ASTM D3176 | wt. % | 38.65 | 34.73 |

*Note:
As received values do not include hydrogen and oxygen in the total moisture.

The average composition and properties of the biochar obtained after such processing are shown in Table 2. More specifically, the biochar includes an increase of about 6 wt. % ash along with a corresponding decrease of about 13-14 wt. % ash.

TABLE 2

Composition & Properties of Average Biochar formed from Corn Stover

|  | METHOD | UNITS | MOISTURE FREE | AS RECEIVED |
|---|---|---|---|---|
| Moisture Total | ASTM E871 | wt. % |  | 12.35 |
| Ash | ASTM D1102 | wt. % | 16.97 | 14.88 |
| Volatile Matter | ASTM D3175 | wt % | 55.44 | 48.59 |
| Fixed Carbon by Difference | ASTM D3172 | wt. % | 27.59 | 24.18 |
| Sulfur | ASTM D4239 | wt. % | 0.103 | 0.090 |
| $SO_2$ | Calculated | lb/mmbtu |  | 0.222 |
| Net Cal. Value at Const. Pressure | ISO 1928 | GJ/tonne | 19.57 | 14.74 |
| Net Cal. Value at Const. Pressure | ISO 1928 | J/g | 19573 | 14737 |
| Gross Cal. Value at Const. Vol. | ASTM E711 | J/g | 20540 | 18004 |
| Gross Cal. Value at Const. Vol. | ASTM E711 | Btu/lb | 8831 | 7741 |
| Carbon | ASTM D5373 | wt. % | 51.50 | 45.14 |
| Hydrogen* | ASTM D5373 | wt. % | 4.46 | 3.91 |
| Nitrogen | ASTM D5373 | wt. % | 1.40 | 1.22 |
| Oxygen* | ASTM D3176 | wt. % | 25.57 | 22.42 |

*Note:
As received values do not include hydrogen and oxygen in the total moisture.

In order to further demonstrate the process of the present disclosure samples of the biochar taken from near the top of the reflux condenser (temperature <1,000° C.) and near the bottom of the reflux condenser (temperature 400-700° C.). The composition and properties exhibited by these biochar samples are provided in Tables 3 and 4.

TABLE 3

Top Biochar Composition & Properties

|  | METHOD | UNITS | MOISTURE FREE | AS RECEIVED |
|---|---|---|---|---|
| Moisture Total | ASTM E871 | wt. % |  | 30.87 |
| Ash | ASTM D1102 | wt. % | 12.16 | 8.41 |
| Volatile Matter | ASTM D3175 | wt. % | 53.91 | 37.27 |
| Fixed Carbon by Difference | ASTM D3172 | wt. % | 33.92 | 23.45 |
| Sulfur | ASTM D4239 | wt. % | 0.097 | 0.067 |
| $SO_2$ | Calculated | lb/mmbtu |  | 0.199 |
| Net Cal. Value at Const. Pressure | ISO 1928 | GJ/tonne | 20.54 | 9.06 |
| Net Cal. Value at Const. Pressure | ISO 1928 | J/g | 20538 | 9061 |
| Gross Cal. Value at Const. Vol. | ASTM E711 | J/g | 21544 | 14893 |
| Gross Cal. Value at Const. Vol. | ASTM E711 | Btu/lb | 9263 | 6403 |
| Carbon | ASTM D5373 | wt. % | 54.13 | 37.42 |
| Hydrogen* | ASTM D5373 | wt. % | 4.63 | 3.20 |
| Nitrogen | ASTM D5373 | wt. % | 1.09 | 0.75 |
| Oxygen* | ASTM D3176 | wt. % | 27.89 | 19.28 |

*Note:
As received values do not include hydrogen and oxygen in the total moisture.

TABLE 4

Bottom Biochar Composition & Properties

|  | METHOD | UNITS | MOISTURE FREE | AS RECEIVED |
|---|---|---|---|---|
| Moisture Total | ASTM E871 | wt. % |  | 16.79 |
| Ash | ASTM D1102 | wt. % | 16.78 | 13.96 |
| Volatile Matter | ASTM D3175 | wt. % | 44.83 | 37.30 |
| Fixed Carbon by Difference | ASTM D3172 | wt. % | 38.40 | 31.95 |
| Sulfur | ASTM D4239 | wt. % | 0.103 | 0.086 |
| $SO_2$ | Calculated | lb/mmbtu |  | 0.210 |
| Net Cal. Value at Const. Pressure | ISO 1928 | GJ/tonne | 20.88 | 14.04 |

TABLE 4-continued

Bottom Biochar Composition & Properties

| | METHOD | UNITS | MOISTURE FREE | AS RECEIVED |
|---|---|---|---|---|
| Net Cal. Value at Const. Pressure | ISO 1928 | J/g | 20878 | 14044 |
| Gross Cal. Value at Const. Vol. | ASTM E711 | J/g | 21774 | 18117 |
| Gross Cal. Value at Const. Vol. | ASTM E711 | Btu/lb | 9362 | 7789 |
| Carbon | ASTM D5373 | wt. % | 54.24 | 45.13 |
| Hydrogen* | ASTM D5373 | wt. % | 4.13 | 3.44 |
| Nitrogen | ASTM D5373 | wt. % | 1.39 | 1.16 |
| Oxygen* | ASTM D3176 | wt. % | 23.36 | 19.44 |

*Note:
As received values do not include hydrogen and oxygen in the total moisture.

EXAMPLE 2

Processing of Saw Dust to Biochar

Saw Dust having the chemical properties shown in Table 5 was processed above its autoignition temperature using a rotary biomass dryer (with reflux condenser and aftercooler stage) according to the teachings of the present disclosure. More specifically, the raw saw dust includes about 0.63 wt. % ash and 84.69 wt. % volatile matter. Overall the saw dust comprises about 49.46 wt. % carbon, 43.80 wt. % oxygen, 0.20 wt. % nitrogen, and 5.89 wt. % hydrogen.

TABLE 5

Saw Dust (Raw) Composition & Properties

| | METHOD | UNITS | MOISTURE FREE | AS RECEIVED |
|---|---|---|---|---|
| Moisture Total | ASTM E871 | wt. % | | 14.19 |
| Ash | ASTM D1102 | wt. % | 0.63 | 0.54 |
| Volatile Matter | ASTM D3175 | wt. % | 84.69 | 72.67 |
| Fixed Carbon by Difference | ASTM D3172 | wt. % | 14.68 | 12.60 |
| Sulfur | ASTM D4239 | wt. % | 0.012 | 0.010 |
| SO$_2$ | Calculated | lb/mmbtu | | 0.027 |
| Net Cal. Value at Const. Pressure | ISO 1928 | GJ/tonne | 18.38 | 13.19 |
| Net Cal. Value at Const. Pressure | ISO 1928 | J/g | 18382 | 13191 |
| Gross Cal. Value at Const. Vol. | ASTM E711 | J/g | 19666 | 16876 |
| Gross Cal. Value at Const. Vol | ASTM E711 | Btu/lb | 8455 | 7256 |
| Carbon | ASTM D5373 | wt. % | 49.46 | 42.44 |
| Hydrogen* | ASTM D5373 | wt. % | 5.89 | 5.05 |
| Nitrogen | ASTM D5373 | wt. % | <0.20 | <0.17 |
| Oxygen* | ASTM D3176 | wt. % | >43.80 | >37.59 |

*Note:
As received values do not include hydrogen and oxygen in the total moisture.

The average composition and properties of the biochar obtained after such processing are shown in Table 6. More specifically, the biochar includes an increase of about 13 wt. % ash and a corresponding decrease of about 34 wt. % ash.

TABLE 6

Composition & Properties of Average Biochar formed from Saw Dust

| | METHOD | UNITS | MOISTURE FREE | AS RECEIVED |
|---|---|---|---|---|
| Moisture Total | ASTM E871 | wt. % | | 37.26 |
| Ash | ASTM D1102 | wt. % | 13.67 | 8.57 |
| Volatile Matter | ASTM D3175 | wt. % | 50.91 | 31.94 |
| Fixed Carbon by Difference | ASTM D3172 | wt. % | 36.43 | 22.23 |
| Sulfur | ASTM D4239 | wt. % | 0.095 | 0.060 |
| SO$_2$ | Calculated | lb/mmbtu | | 0.195 |
| Net Cal. Value at Const. Pressure | ISO 1928 | GJ/tonne | 20.60 | 7.20 |
| Net Cal. Value at Const. Pressure | ISO 1928 | J/g | 20596 | 7197 |
| Gross Cal. Value at Const. Vol. | ASTM E711 | J/g | 21523 | 13503 |
| Gross Cal. Value at Const. Vol. | ASTM E711 | Btu/lb | 9254 | 5806 |
| Carbon | ASTM D5373 | wt. % | 54.39 | 34.13 |
| Hydrogen* | ASTM D5373 | wt. % | 4.27 | 2.68 |

TABLE 6-continued

Composition & Properties of Average Biochar formed from Saw Dust

|  | METHOD | UNITS | MOISTURE FREE | AS RECEIVED |
|---|---|---|---|---|
| Nitrogen | ASTM D5373 | wt. % | 1.12 | 0.70 |
| Oxygen* | ASTM D3176 | wt. % | 26.45 | 16.59 |

*Note:
As received values do not include hydrogen and oxygen in the total moisture.

Figure 7A:
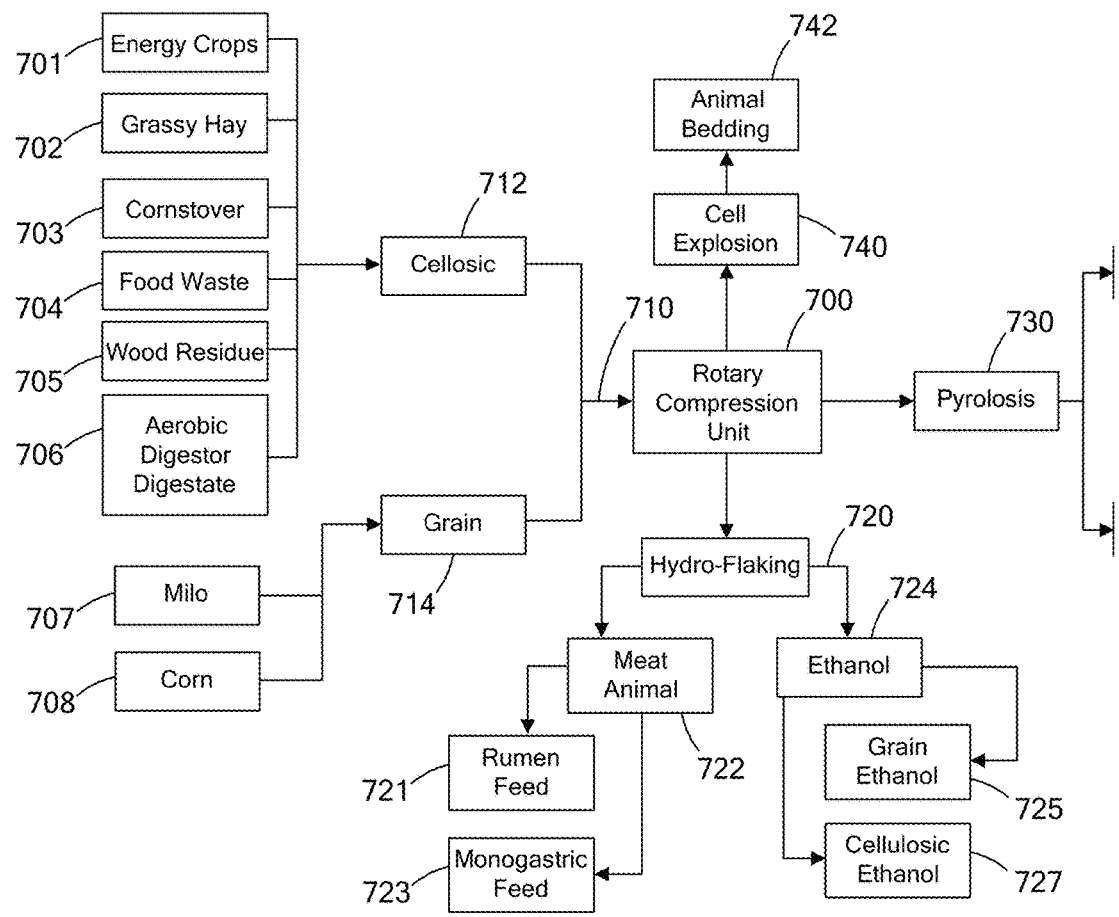
FIG. 7A illustrates a flow diagram for inlet and outlets to an RCU according to the present disclosure.
Figure 7B:
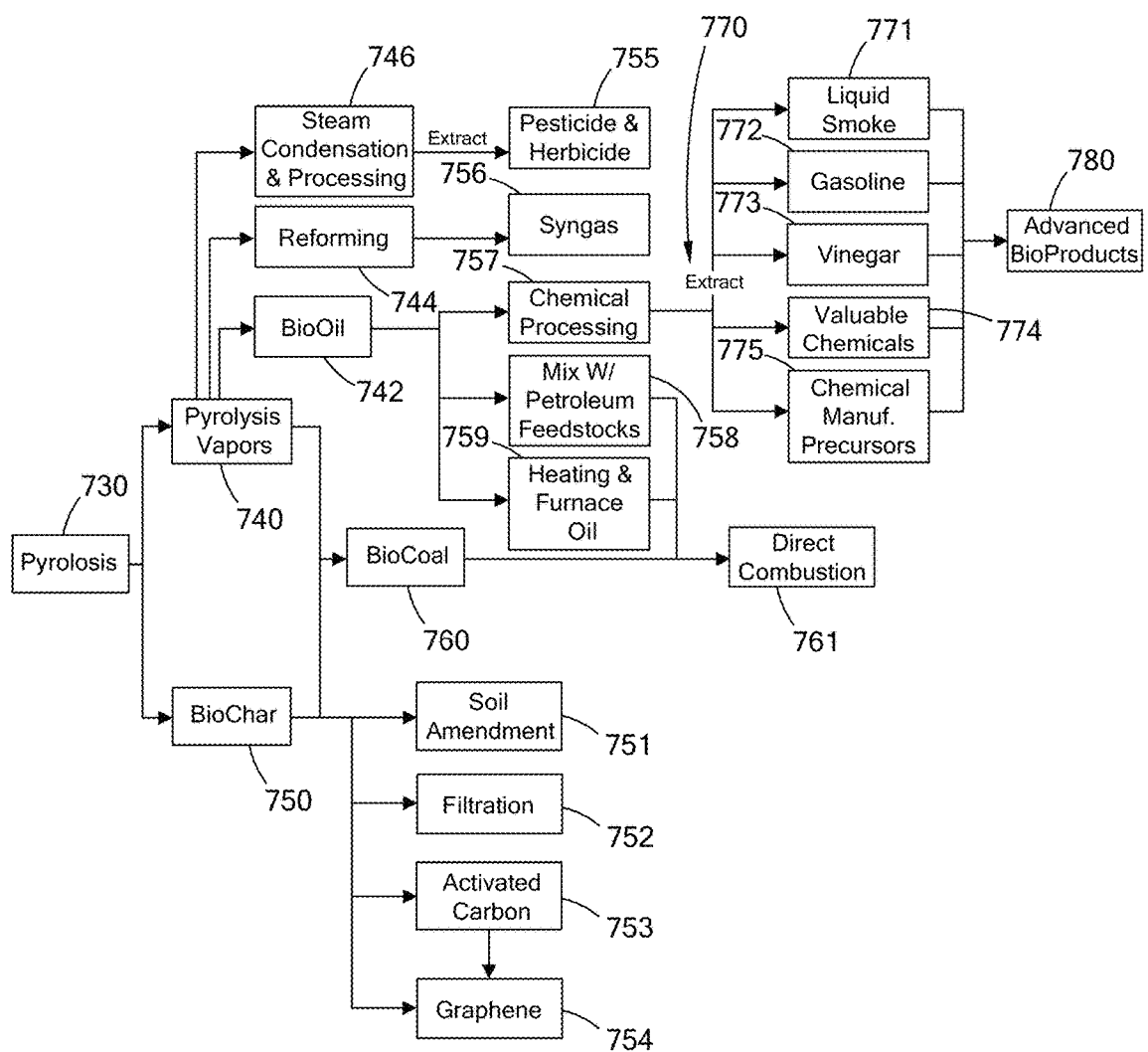
FIG. 7B illustrates a flow diagram of the available processing for the pyrolysis outlet stream from the RCU.

Referring to FIGS. 7A-7B, a flow chart illustrating the various uses to form a variety of products from a variety of starting materials is shown using the biomass rotary compression system described hereinabove. Typically, starting materials (710) are fed into an RCU (700). Feedstock can be any woody or non-woody material with sufficient fiber to resist compression and can be processed in an RCU. Additionally, animal manures and human waste, waste from paper mills, sludge waste streams from anaerobic digesters can be processed. Fiber such as cornstover or saw dust can be added to improve processing capabilities. Starting materials can be cellulosic (712), grain (714) or a combination thereof. Examples of cellulosic materials include energy crops (701), grassy hay (702), cornstover (703), wood waste (704), wood residue (705), and/or aerobic digester digestate (i.e., food waste, human waste, animal waste) (706). Examples of grain (714) include milo (707) and corn (708).

Feed grains such as corn, milo, or oats can be processed through the RCU. The rapid compression and friction generates heat within the grain causing a steam explosion thereby exposing additional starch granules to gelatinization resulting is improved weight gains and overall feed efficiency. Starch gelatinization is the breakdown of the crystalline matrix of the starch globule when exposed to heat and moisture. Conventionally this is completed by grinding or by steam flaking with a boiler. Increases have been observed in starch damage (a measure of gelatinization) from 0.64% degradation in raw samples (ground only) to 19.03% degradation when the corn is processed to 200° F. using the RCU. Increased degradation equals more availability of the starches. Further the product is now sterile and has extended shelf life with an additional drying step. Hydroxides can be added to destroy certain toxins not uncommon in cereal grain such as Aflatoxins.

Cellulosic fiber can be processed through the RCU to expose additional starch to enzyme action in cellulosic ethanol operations. The processed fiber is now sterile and can be safely stored without or at least reduced risk of mold and bacterial formation. This allows the RCU to be used as a pre-treatment to cellulosic ethanol methods. The material is sterilized for long term storage as well as starch made more available as a result of the steam explosion. In an example, fresh poultry litter was processed through the RCU into a partially carbonized product. This material was stored in the high humidity and temperature of a climate for over 8 months. Plate counts were performed on the material after this storage and plate counts for coliforms and enterobacters were nonexistent. This supports the sterilization of the fiber/product after processing by the RCU.

Thermal conditions can be controlled by rotational speed of the auger and feed rate of the starting materials. This can be adjusted to either maintain or raise the temperature of the RCU (700). As previously discussed, depending on the temperature within the RCU (700), the biomass starting materials (710) are treated to a temperature below autoignition, causing hydro-flaking (720), or the temperature is raised above autoignition causing pyrolysis (730) or an intermediate temperature causing partial pyrolysis and thus cell explosion (740).

Hydro-flaking (720) causes the removal of unbound water. Due to the increased heat and pressure, that unbound water coverts to steam. When the steam explodes out of the RCU, it causes cell explosion of the starting materials.

If the starting material is a form of grain (714), it can be provided as a source of material to be processed to be used for feed for animals, such as meat animals (livestock, cattle, etc.) (722) or ethanol (724). Examples of feed (722) uses include rumen feed (721) and monogastric feed (723). If the starting material is cellulosic (712), the material produced through hydro-flaking (720) can also be converted to ethanol (724). Examples of ethanol (724) products include grain ethanol (725) and cellulosic ethanol (727).

In addition to drying, the hydro-flaking of the cellulosic material improves the porosity of the dried component as a result of steam explosion. The cell explosion (740) forms flakes of the dried starting material which can also be used for animal bedding (742). When processed close to autoignition, slight charring of a portion of the biomass creates a process capable of adsorbing ammonia fumes. The cell explosion (740) and hydro-flaking (720) are effectively the same process. It causes the cells to open allowing access to the starches within the starting material and thus allows for better ethanol production in greater yields. The source of the steam is from the compression and temperature raising of the unbound water found in the starting material.

If the temperature is raised to above autoignition, pyrolysis (730) ensues. The pyrolysis process (730) releases unbound water, bound water, as well as pyrolysis vapors (740). The remaining solid component formed is a carbonized bio-product, referred to as biochar (750).

Pyrolysis vapors (740) typically consists of three components, pyroligneous acid (PLA), bio-oil, and tar. The bio-oil and PLA can be separated by adding water up to a suitable concentration once the pyrolysis vapors (740) are condensed into pyrolysis liquid. In an example, at least 30-40% water is added to the pyrolysis liquid which allows for a natural separation to occur. The PLA is suitable to be treated through steam condensation and processing (746) and extracted forming pesticides and herbicides depending on the dilution. A first dilution of PLA forms a pesticide and even further dilution forms an herbicide (755).

The pyrolysis vapors (740) can also experience a reforming step (744) which separates out syngas (756). Syngas, or synthesis gas, is a fuel gas mixture consisting primarily of hydrogen, carbon monoxide, and very often some carbon dioxide. Syngas is effective as an intermediate resource for production of hydrogen, ammonia, methanol, and synthetic hydrocarbon fuels. Syngas is also used as an intermediate in producing synthetic petroleum.

Bio-oil (742) on its own can be a viable and useful product. As part of the pyrolysis vapors, it can be collected and separated from the PLA and tars to be used in a plurality of ways. The bio-oil (742) can chemically processed (757) to thereby extract (770) several components such as liquid smoke (761), gasoline or transportation fuels (762), vinegar (773), other valuable chemicals (774) such as various hydrocarbons, and/or chemical manufacturing precursors (775). These products can be collectively being referred to as "advanced bio-products" (780). In another example, bio-oil (742) can be mixed with a petroleum feedstock (758) or used as heating and furnace oil (758) for direct combustion (761) applications.

Biochar (750) on its own can serve a variety of purposes. It can be suitable as a viable soil amendment (751) or several filtration (752) applications. It can be further treated by microwave or some other chemical treatment to form activated carbon (753). The RCU can also form graphene or graphene precursors if the biomass is treated with KOH in-situ. Biochar is an efficient nutrient carrier that allows increased cation exchange between the natural flora of soil and plants.

For soil amendment (751), this exchange and increase in nutrients results in increased growth, increased yield, and improved moisture retention of the soil in which the biochar is placed. The biochar (750) is not to be thought of as a fertilizer but rather the transport matrix for beneficial fertilizer nutrients and microorganisms. The biochar (750) can be "charged" with nutrients or substances before placing in soil in order to utilize efficiently its soil-enhancing properties. This biochar (750) could be coupled in some amount into a "kit form." This kit would also include compost in a plastic pail. The biochar (751) could be mixed in loose form or in a biochar puck (think Hockey puck), crumble, or tablet form. Upon receipt by the home gardener, water can be added. The puck or tablets swell with water and are then incorporated into the compost thereby producing a material ready to be deployed into garden soils. Pucks, or the longer log versions, solve the problem of transporting low bulk density products. The kits could also contain inoculates, enzymes, beneficial microorganisms, and fertilizer. In additional, the tablet or crumble form may be distributed by commercial fertilizer spreaders onto areas of gardens or lawns and then water is added to "dissolve" the solid. This distribution method solves the problem of carbon dust and small particles being inhaled during handling as well as keeps the biochar in place during rains and inclement weather.

Conventional pyrolysis methods are classified as slow, fast or flash, rated for time at temperature. These processes can control time and temperature whereas the present disclosure method and system with the RCU described hereinabove not only allows for management of time and temperature but also atmosphere and pressure. This feature provides for improvements over conventional pyrolysis. The RCU produces biochar, bio-coal, bio-coke, bio-oil, activated carbon precursors for biofuel and graphene precursors. The RCU can also produce syngas and bio-oil that can be condensed and contains a range of cyclopentanones, methoxyphenol, acetic acid, methanol, acetone, formic acid, levoglucosan, and the like. Liquid, gaseous, or solid additives can be added to the feedstock to achieve unique properties. For pyrolysis, the atmosphere must be oxygen depleted or minimized. The RCU creates an inert blanket by steam flash drying the product being processed with its unbound water. The steam restricts combustion as the process exceeds 500-750° F. With the addition of hydroxides like KOH to the RCU process, it is believed possible to produce an activated graphene precursor without a separate activation step. Conventional activation of carbon is completed after the carbon has been produced and is completed using either heat or acid. Adding KOH to the process as the carbon is produced completes this in one step.

Biomass also contains iron. Cornstover contains approximately 122 mg/kg of stover material, while wood contains approximately 77-100 mg/kg of wood. Grasses range from 200-400 ppm of iron depending on species and soil. As the biomass is thermally and chemically broken down in the RCU, sufficient acid is produced to strip oxygen from the iron. Elemental iron serves to catalyze reactions thereby producing higher yields of bio-oil.

Chemical additives can be added to starting materials to be processed. These additives can be acidic to further increase the rate of lignin breakdown or basic to also breakdown lignin cell structure and also provide for means to produce single step activated carbon.

The addition of hydroxides to biochar (750) and bio-coal (760) process is thought to increase the porosity of the material through chemical scouring of pores, thus increasing water uptake of the material. Conventional activated carbon requires multiple steps therefore a significant savings in time and resources is provided. The self-generated steam blanket can be augmented with additional steam to facilitate the production of hydrogen through steam reforming to produce syngas. This steam blanket produced inherently in the process, allows the RCU to be operated in a continuous fashion with varying moisture contents while eliminating the chance of oxidation or combustion. This elimination of combustion at the end of the process removes the need for additional water to be added to the biochar products to produce stability as other biochar production methods require.

The RCU creates high pressures as the material is compressed via frictional carbonization. This pressure affords may mechanistic attributes not achievable through conventional pyrolysis methods. Conventional torrefaction requires two steps to produce a material that can be upgraded to biochar. Torrefaction requires a separate drying and fine grinding step before the torrefaction process to be efficient. The torrefaction process does not result in biochar by itself. The torrefied material must then be upgraded to biochar using a separate pyrolysis process, resulting in four steps total.

It has been demonstrated that biochar processed in the RCU of the present disclosure exhibits higher porosity hence higher moisture adsorption/retention, high fixed carbon, low odor, higher solids yield, 30-35% compared to 20-30% with conventional pyrolysis. When pressure is observed in the bio-oil product, stability is increased and tar formation is decreased. In wood biochars, a comparison was done between oak biochar, treated according to the present disclosure, to a commercial wood biochar in the water holding capacity. The commercial char after three replicates averaged could hold 4.45 times its dry weight in water compared to 4.71 times dry weight in water that an RCU biochar could hold. Additionally, the high pressure provides for the creation of graphene and/or graphene precursors beyond the properties found in typical activated carbon. Graphene is valuable for microelectronics and storage batteries.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of producing bio-products from starting biomass materials, the method comprising the steps of:
    providing a starting biomass material comprising a moisture-containing or water-laden material;
    producing friction and compression to generate a desired elevated temperature and steam from bound and unbound water within the starting biomass material;
    mixing and heating the starting biomass material resulting from the steam that is formed from increased friction and pressure such that the biomass flows evenly onto itself;
    removing the bio-product;
    cooling the bio-product; and
    collecting the bio-product.

2. The method of claim 1, wherein the starting biomass material is either a woody or a non-woody biomass.

3. The method of claim 1, wherein the starting biomass material is heated to a temperature below autoignition.

4. The method of claim 3, wherein steam explosion and hydro-flaking occurs by causing cell explosion and wherein the bio-product is dried flakes of the starting biomass material free from bound water.

5. The method of claim 4, wherein the bio-product from the hydro-flaking is operable to form starting materials for any one of animal bedding, animal feed, and ethanol.

6. The method of claim 1, wherein the starting biomass material is heated to a temperature at or above autoignition causing pyrolysis of the starting biomass material and wherein the pyrolysis reaction generates steam, pyrolysis vapors, and biochar.

7. The method of claim 6, further comprising the step of condensing the bio-product.

8. The method of claim 7, wherein the bio-product is bio-coal.

9. The method of claim 7, further comprising the steps of condensing the pyrolysis vapors to generate a pyrolysis liquid, the pyrolysis liquid comprising bio-oil, pyroligneous acid (PLA), and tar and the bio-product is biochar.

10. The method of claim 9, further comprising cooling the pyrolysis vapors and wherein the pyrolysis vapors move downward and then turn back upward, the cooling and turning of the pyrolysis vapors causing fines and particles of tar to drop.

11. The method of claim 10, wherein the pyrolysis vapors are sprayed with water causing the pyrolysis vapors and the water to cool and condense into pyrolysis liquid forming a mixture of water, bio-oil and PLA.

12. The method of claim 11, further comprising the steps of spraying water on the pyrolysis vapors to about 30-40% water mixed with the pyrolysis liquid and separating the bio-oil from the PLA.

13. The method of claim 9, further comprising the steps of combining the bio-oil with the biochar forming a bio-coal.

14. The method of claim 9, wherein the biochar is pretreated to remove inorganic compounds in order to form coke.

15. The method of claim 6, further comprising subjecting the biochar to a second energy source and an activation agent in order to form activated carbon.

16. The method of claim 6, wherein the biochar is used as a starting material for any one of a soil amendment, a filtration device, activated carbon, and graphene.

* * * * *